United States Patent [19]
Cotreau

[11] Patent Number: 5,517,565
[45] Date of Patent: May 14, 1996

[54] INTEGRATED RINGER RELAY CIRCUIT AND METHOD

[75] Inventor: Gerald M. Cotreau, Melbourne, Fla.

[73] Assignee: Harris Corporation, Melbourne, Fla.

[21] Appl. No.: 269,133

[22] Filed: Jun. 30, 1994

[51] Int. Cl.⁶ .............................. H04M 3/02; H04M 19/02
[52] U.S. Cl. ........................ 379/252; 379/382; 379/405; 379/399
[58] Field of Search ........................... 379/372, 373, 379/418, 399, 251, 252, 253, 255, 377, 382, 296, 405

[56] References Cited

U.S. PATENT DOCUMENTS

| | | | |
|---|---|---|---|
| 4,396,805 | 8/1983 | Wagner | 379/252 |
| 4,472,608 | 9/1984 | Beirne | 379/399 |
| 4,476,350 | 10/1984 | Aull et al. | 379/382 |
| 4,595,797 | 6/1986 | Gilles et al. | 379/418 |
| 4,776,007 | 10/1988 | Styrna et al. | 379/398 |
| 4,827,505 | 5/1989 | Takato et al. | 379/377 |
| 4,837,818 | 6/1989 | Pieters et al. | 379/252 |
| 4,961,219 | 10/1990 | Patel | 379/398 |
| 5,323,460 | 6/1994 | Warner et al. | 379/399 |

Primary Examiner—Jeffery Hofsass
Assistant Examiner—Parag Dharia
Attorney, Agent, or Firm—Rogers & Killeen

[57] ABSTRACT

A circuit and method for isolating a subscriber line interface circuit ("SLIC") from the ringer generator in a telephone system. The circuit uses a gain blocking device to provide a signal gain when the ringer generator is not being utilized and to provide a high impedance when a ringer signal is present. The high impedance may be provided through an amplifier circuit which is tri-stated when the amplifier is not energized.

31 Claims, 5 Drawing Sheets

INTEGRATED RINGER RELAY CIRCUIT AND METHOD

BACKGROUND OF THE INVENTION

The present invention relates to a subscriber line interface circuit for a telephone system, and more particularly to a current or voltage subscriber line interface circuit in which the interface circuit is isolated from high AC voltages, such as from a ringer generator without a relay or other device which might substantially distort the signal on the telephone line.

A telephone system subscriber line interface circuit (SLIC) connects a balanced two-wire transmission path (the path to and from the subscriber telephone handset) with an unbalanced four-wire transmission path (the path between telephone central offices). SLICs perform various functions, including battery feed, overvoltage protection, ringing, signaling, hybrid, and timing.

SLIC operation is known and need not be considered in detail. By way of brief explanatory example, and with reference to FIG. 1, a current mode SLIC 10 (a SLIC that processes currents related to the signals in the transmission paths, rather than the voltages) uses current information available in the tip and ring voltage sensing resistors R1 and R2 at the two-wire side of the SLIC. The current information is provided to a hybrid circuit 12 that detects incoming signals and sends them in the correct direction. The hybrid circuit 12, in combination with external circuitry 14 connected to the four-wire side of the SLIC, provides appropriate amplification, transhybrid echo cancellation, and impedance matching.

The present invention is related to the application of ringer generator signals to the telephone circuit. With reference to FIG. 2, a SLIC 30 may be connected to a telephone instrument (represented by the resistor 32) through tip and ring paths (T, R). When the tip and ring paths are carrying a voice signal, the signal is generally on the order of 3 volts in amplitude, requiring current on the order of 4 ma in amplitude, having a bandwidth of up to 16 kHz, and a precision (or distortion) on the order of tenths of a percent. The voice transmission signal is bidirectional and sometimes the battery feed is superimposed on the voice signal, yielding a current of up to 30 ma in amplitude. Moreover, the tip and ring paths (and all switches contained therein) cannot introduce any crossover distortion when the current through the circuit changes direction.

Generally, telephone instruments are caused to "ring" by the instrument's detection of a ringer signal across the tip and ring leads. The ringer signal is selectively applied to the transmission path to alert the telephone instrument of an incoming call and generally remains on the transmission path until the telephone is "answered" by taking the telephone instrument off hook. While the tip and ring paths must carry both the voice and the ringer signals (not necessarily simultaneously), the characteristics of the two types of signals are markedly different. For example, a typical ringer signal may have voltage amplitudes of plus-to-minus 150 volts, current amplitudes of up to 200 ma, a bandwidth of 75 Hz. Generally, distortion and crossover distortion of the ringer signal are not important considerations for ringer signals.

Combining the requirements of the two types of signals, voice transmission and ringer signals, yields the requirement that the circuit between the SLIC and the telephone instrument must function as a two channel multiplexer (or switch), where one switch must pass a voice signal without affecting the bandwidth or distortion level and the other switch must pass the very high currents of the ringer generator and must withstand and block the very high ringer voltages when the switch is off. With reference to FIG. 2, switches SW1 and SW2 may be selectively operated to apply the ringer signal, generated by the ringer generator 34, to the transmission path. At or before the time that the ringer signal is applied to the transmission path, the SLIC is protected by opening the circuit between the ringer generator and the SLIC using the switches SW3 and SW4.

This requirement has been met in the prior art by relays. As is well known, the relay is a short circuit when on and an open circuit when off. Generally, a relay has the characteristics of an ideal switch, simultaneously meeting the precision and bandwidth requirements of the voice switch and the current and voltage requirements of the ringer switch. Electro-mechanical relays are well known in the prior art but are comparatively expensive, slow, occupy valuable circuit real estate, and consume relatively high amounts of power to operate. Accordingly, it is known in the prior art to use solid state switches and multiplexers; however, such devices are generally far from ideal and cannot fully satisfy all the requirements simultaneously. Attempts have been made in the prior art to integrate the required solid state switches in series with the hybrid of the SLIC; however, such attempts have usually resulted in a substantial degradation of the voice signals.

Accordingly, it is an object of the present invention to provide a novel method and apparatus for coupling a SLIC and a ringer signal to a telephone instrument.

It is another object of the present invention to provide a novel method and apparatus for isolating a SLIC from the ringer signal.

It is yet another object of the present invention to provide a novel method and apparatus for integrating with a SLIC a means for isolating the SLIC from a ringer signal.

It is still another object of the present invention to provide a novel method and apparatus for interfacing between a SLIC and a ringer signal without substantial degradation of the voice signal.

It is a further object of the present invention to provide a novel method and apparatus in which the means for isolating a SLIC from other portions of a telephone circuit are integrated into the same integrated circuit as the SLIC.

It is still a further object of the present invention to provide a novel method and apparatus for isolating a SLIC from a ringer signal without placing a switch between the tip and ring terminals of the SLIC and the ringer generator.

These and many other objects and advantages of the present invention will be readily apparent to one skilled in the art to which the invention applies from a perusal of the claims, the appended drawings, and the following detailed description of the preferred embodiments.

DESCRIPTION OF THE PREFERRED EMBODIMENTS

Figure 1:
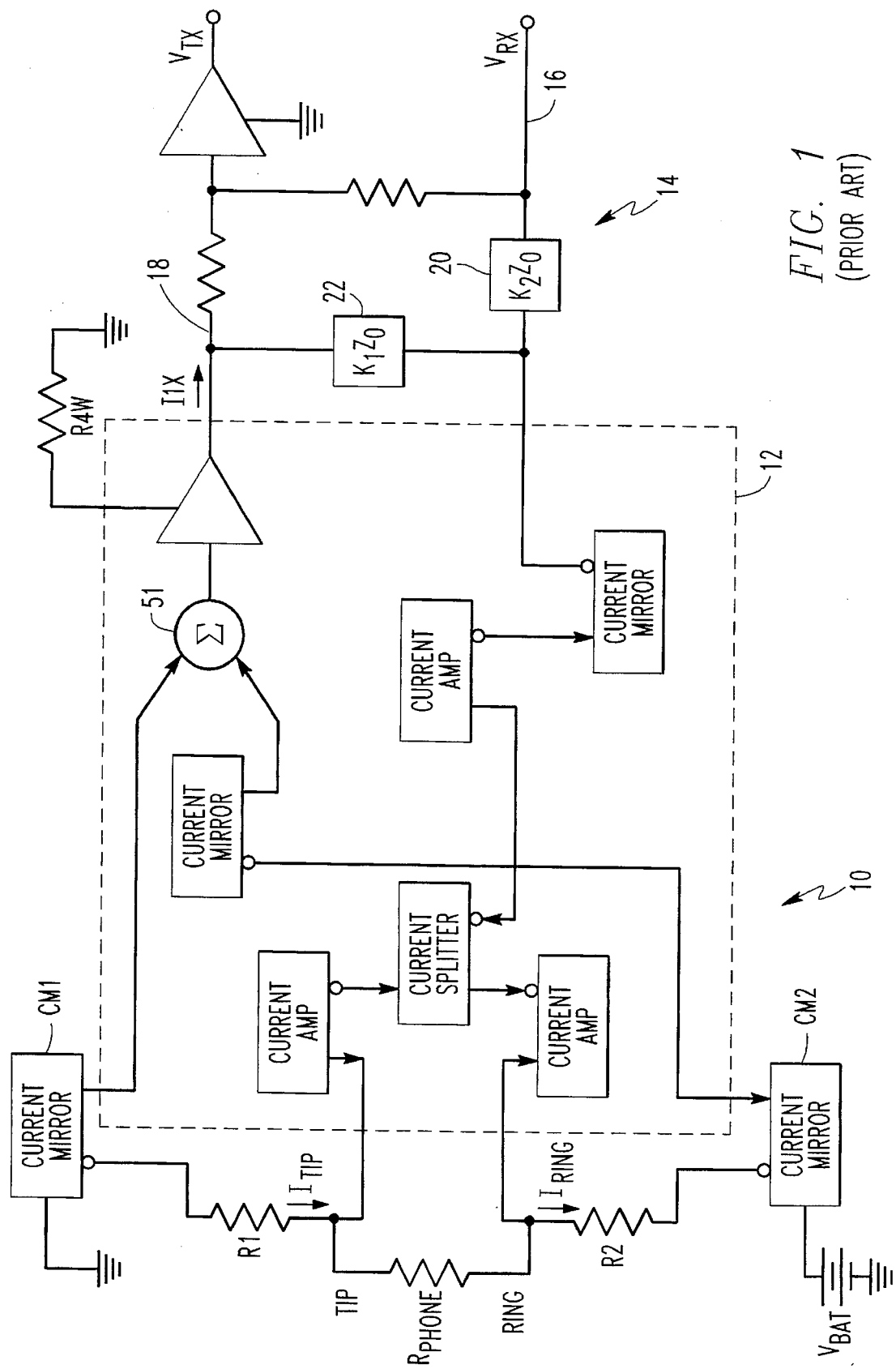
FIG. 1 is a block diagram of a current mode subscriber line interface circuit (SLIC) of the prior art.
Figure 2:
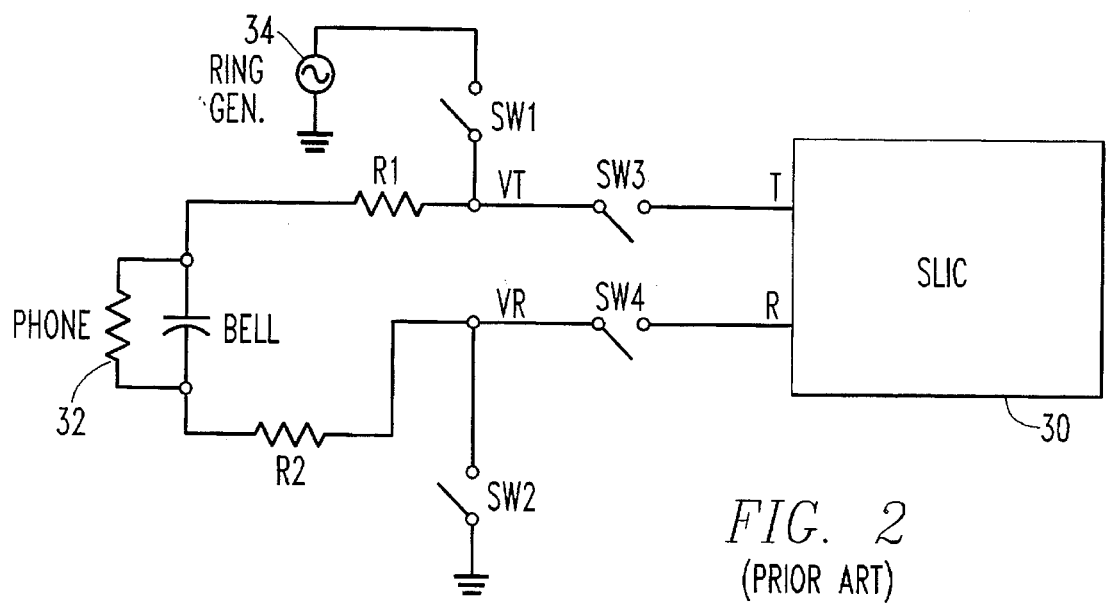
FIG. 2 is a functional block diagram of a SLIC, telephone instrument, switches and ringer generator of the prior art.
Figure 3:
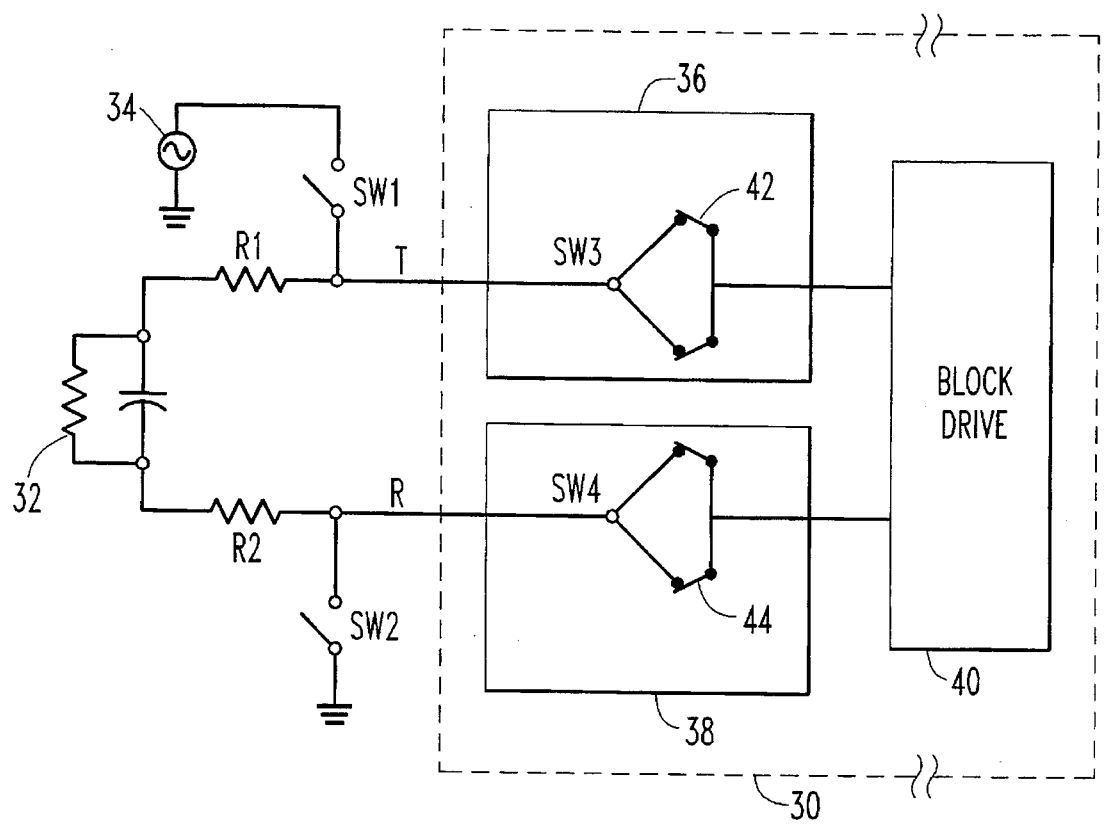
FIG. 3 is a partial block diagram of a circuit in accordance with the present invention.

With reference to FIG. 3, where like elements bear like reference numerals to those used in FIG. 2, a telephone circuit may include a SLIC 30 electrically connected to a telephone, represented by resistor 32, through circuitry represented by resistor R1 and resistor R2 along the tip and ring paths. The ringer signal from a ringer generator 34 may be selectively applied to the tip and ring paths through switches SW1 and SW2. Current gain blocks 36, 38 under the control of a current block drive 40 interconnect the tip and ring paths with the SLIC 30. The current gain blocks 36, 38 each include an amplifier 42, 44, respectively.

Switches SW1 and SW2 may be conventional high voltage switches, such as reversed back-to-back SCRs, relays, solid state switches. The SCRs readily handle the voltages of the ringer signal but are not generally suitable for the switches from the SLIC because the turn on behavior of the SCRs causes severe crossover distortion when the switched currents (in the tip and ring paths) reverse direction. Generally, solid state high current switches also have a similar problem as the SCRs and are unacceptable for use as switches in the voice transmission path.

In operation, the amplifier 42 in the current gain block 36 delivers the SLIC drive to the tip terminal of the SLIC. Current gain block 38 similarly contains the amplifier 44 which drives the ring terminal. Both current gain blocks 36, 38 are designed to selectively enter a tri-state mode where the amplifiers are off and their outputs look like high impedances. Accordingly, when it is desired to ring the telephone, the switches SW1 and SW2 are closed and the amplifiers 42, 44 in the current gain blocks 36, 38 are turned off, i.e., the outputs of the amplifiers 42, 44 appear as high impedances. When the ring generator 34 provides the ring signal, the signal drives the tip and ring paths of the telephone line and the outputs of the current gain blocks 36, 38 bear the ringer signal voltage. Note that the outputs of the current gain blocks 36, 38 are not disconnected from the transmission path, they simply go into a high impedance state and bear the voltage of the ringer signal.

With continued reference to FIG. 3, when the ringer generator 34 is turned off or is disconnected from the transmission path by opening of the switches SW1 and SW2, the amplifiers 42, 44 may be turned on, and, operating normally, the amplifiers 42, 44 drive the transmission path directly from the current signal supplied from the current block drive 40 with no distorting or bandwidth limiting device, such as a switch, in the path. While no physical switch is in the transmission path from the SLIC to the telephone, the function of protecting the SLIC from the ringer signal voltage is embedded in the amplifiers 42, 44. When the amplifiers 42, 44 are turned on, they operate normally; but, when they are turned off, they are tri-stated and function to isolate the SLIC from the ringer voltage.

While the circuit of the present invention is shown in FIG. 3 as a current gain block, the invention could be just as readily implemented in a voltage SLIC, i.e., the amplifiers in the gain blocks 36, 38 can be voltage driven from a signal derived from a voltage block drive.

Figure 4:
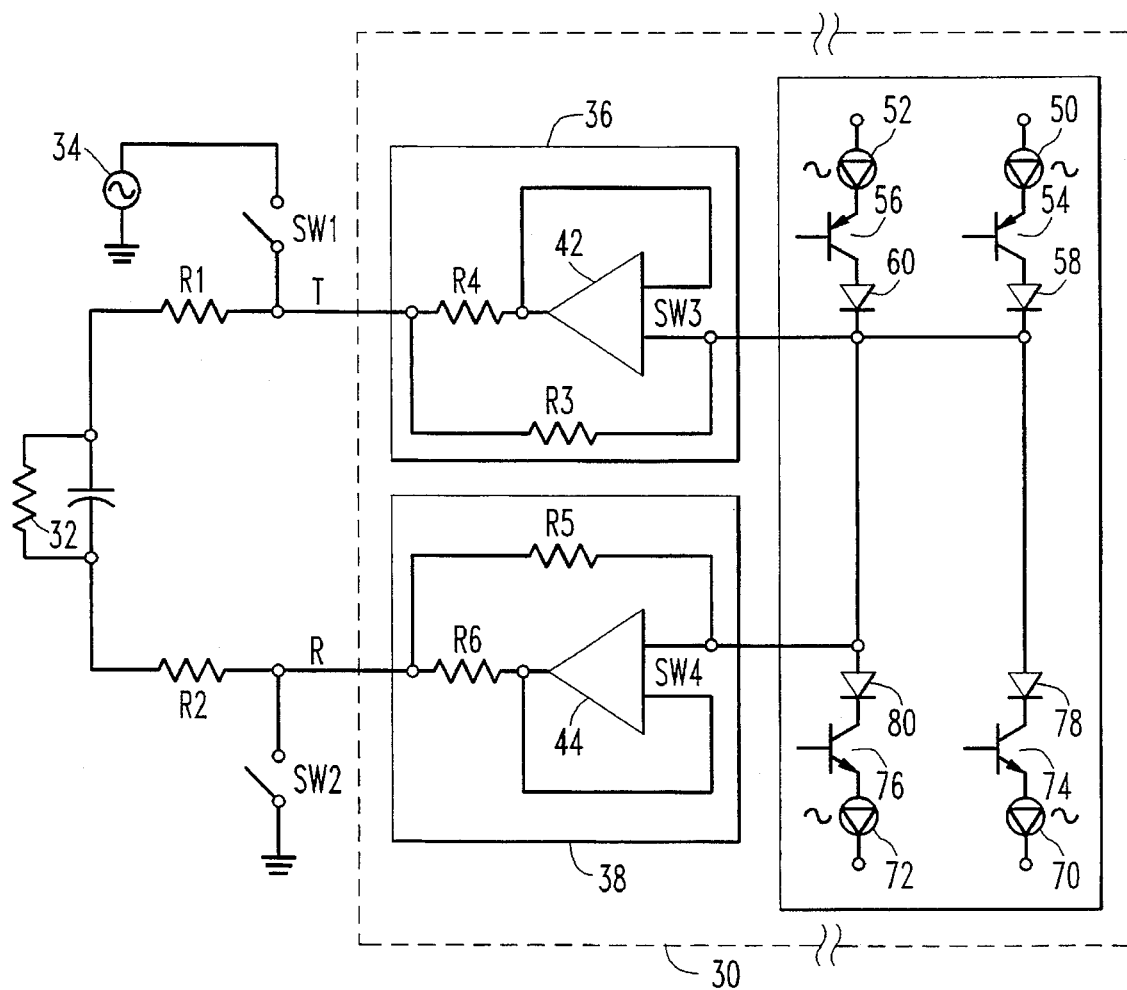
FIG. 4 is a partial block diagram of another circuit in accordance with the present invention.

With reference to FIG. 4, another embodiment of the present invention, more detailed than that shown in FIG. 3, a SLIC 30 may drive a telephone line (and telephone 32). A ringer generator 34 may be selectively coupled to the telephone line through operation of the switches SW1, SW2. The SLIC 30 may include current gain blocks 36, 38 and a current block drive 40, similar in function to those described in relation to the like numbered elements in FIG. 3.

The current gain block 36 may include an op amp 42, a forward resistor R4, a feedback resistor R3, and two feedback paths, one through the feedback resistor. The other current gain block may likewise include resistors R5 and R6, and similar feedback paths.

The current block drive 40 may include current sources 50, 52 each electrically connected through a pnp transistor 54, 56 and a diode 58, 60 to the op amps 42, 44 respectively. Similarly, the current block drive 40 may include current sinks 70, 72 each of which are electrically connected through a npn transistor 74, 76 and a diode 78, 80 to the op amps 42, 44 respectively.

With continued reference to FIG. 4, in operation, the current sources 50, 52 along with the pnp transistors 54, 56 source current to the circuit. Similarly, the current sinks 70, 72 along with the npn transistors 74, 76 sink current from the circuit. Each of the diodes 58, 60, 78, 80 are blocking diodes so that when the op amps 42, 44 are tri-stated (and the transmission path is being driven by the ringer generator 34), the collector-base junctions of the pnp and npn transistors 54, 56, 74, 76 will not reverse bias. For example, if the op amp 42 is off and tri-stated and the switch SW1 is closed, the voltage at the tip path will swing between the amplitude of the ringer signal (up to ±150 volts). When the voltage at the tip path is at +150 volts, the feedback resistor R3 will pull the cathode of the diode 58 to ±150 volts, reverse biasing it. When the voltage at the tip path goes to −150 volts, the feedback resistor R3 will pull the cathode of the diode 58 to −150 volts, but the diode 58 will remain forward biased and the pnp transistor 54 remains in its normal mode of operation with a reverse biased collector-base junction.

In a preferred embodiment, the pnp and npn transistors are bipolar transistors. The junction breakdowns of the diodes and the transistors must be adequate to handle the voltage and current of the ringer signal which will be experienced in operation.

Figure 5:
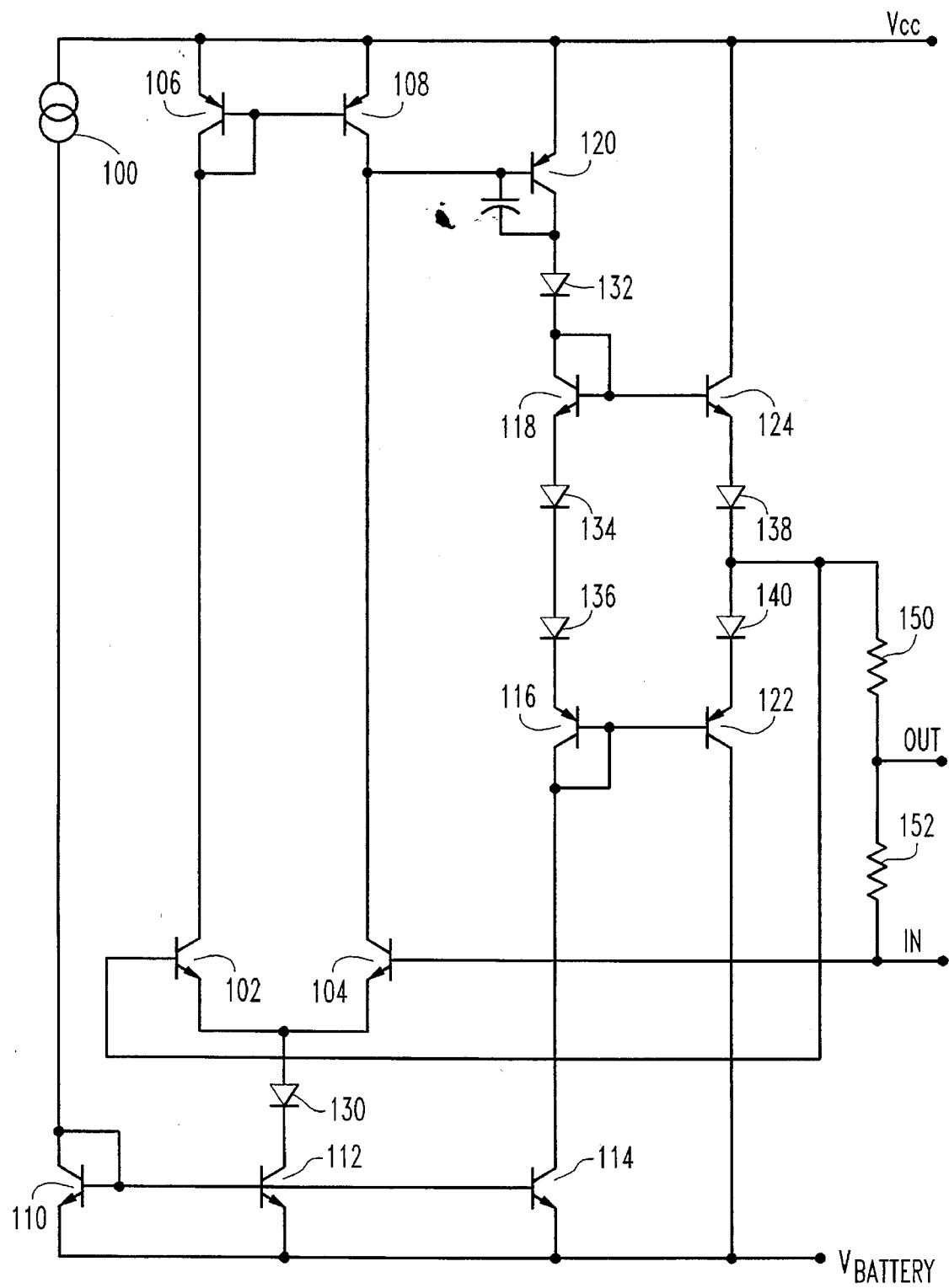
FIG. 5 is a partial block diagram of another circuit in accordance with the present invention detailing one embodiment of an op amp which may be used in the present invention.

With reference to FIG. 5, the op amp and current block drive of the circuit of FIG. 4 may include a current source 100, input bipolar transistors 102, 104, feedback resistors 150, 152, bipolar transistors 106–124, and diodes 130–140 electrically connected. As shown, the circuit of FIG. 5 operates as a two stage op amp with all bias currents and voltages derived from the current source 100. If the current source 100 is on, the amplifier circuit functions normally as an op amp. The resistors 150, 152 and the op amp form a current gain block. For example, a current flowing into the node IN will flow into the resistor 152 causing an input across the input bipolar transistors 102, 104, causing the amplifier to drive the resistor 150 until the two resistors 150, 152 have the same voltage across them. When this occurs, the current at the OUT node will be equal to the current at the IN node multiplied by the ratio of the resistance of the two resistors 152, 150, i.e., R152/R150.

With continued reference to FIG. 5, when the current source 100 is off, the amplifier is completely shut off, and the node OUT goes to a high impedance state. For example, if the amplifier is shut off and a voltage of 150 volts (from the ringer signal) is applied across the OUT node, the transistors 112, 114 and 122 take the voltage across their collector-base junctions and the diodes 136, 138 reverse bias. On the other hand, if the voltage across the OUT node goes to −150 volts, transistors 120, 124 take the voltage across their collector-base junctions and diodes 130, 134 and 140 reverse bias. Note that in this embodiment of the present invention, while the output node of the op amp is forced to a voltage far outside its supply rails, the amplifier is not destroyed because of the use of the high breakdown diodes which are forward biased when the amplifier is operating.

Usually a SLIC performs more than just the function of driving the transmission line but also performs a variety of other functions including echo cancellation, impedance matching and, in general, interfacing between a telephone instrument and the telephone network. In accomplishing these functions, it is often necessary for the SLIC to sense (or detect) conditions occurring on the transmission line, particularly those conditions initiated at the telephone instrument (e.g., ground key, hook flash, etc.). In prior art systems, it was often required to protect the sensing elements from the high voltages and currents associated with the ringer voltage and the sensing elements would. Accordingly, sensing elements and circuits would often be placed behind the switches in the transmission path, so that the elements could be isolated from the transmission path when a ringer signal was being applied. Because the present invention does not use conventional switches to isolate the SLIC from the ringer signal, it is desirable to protect the sense elements through some other mechanism than previously used.

Figure 6:
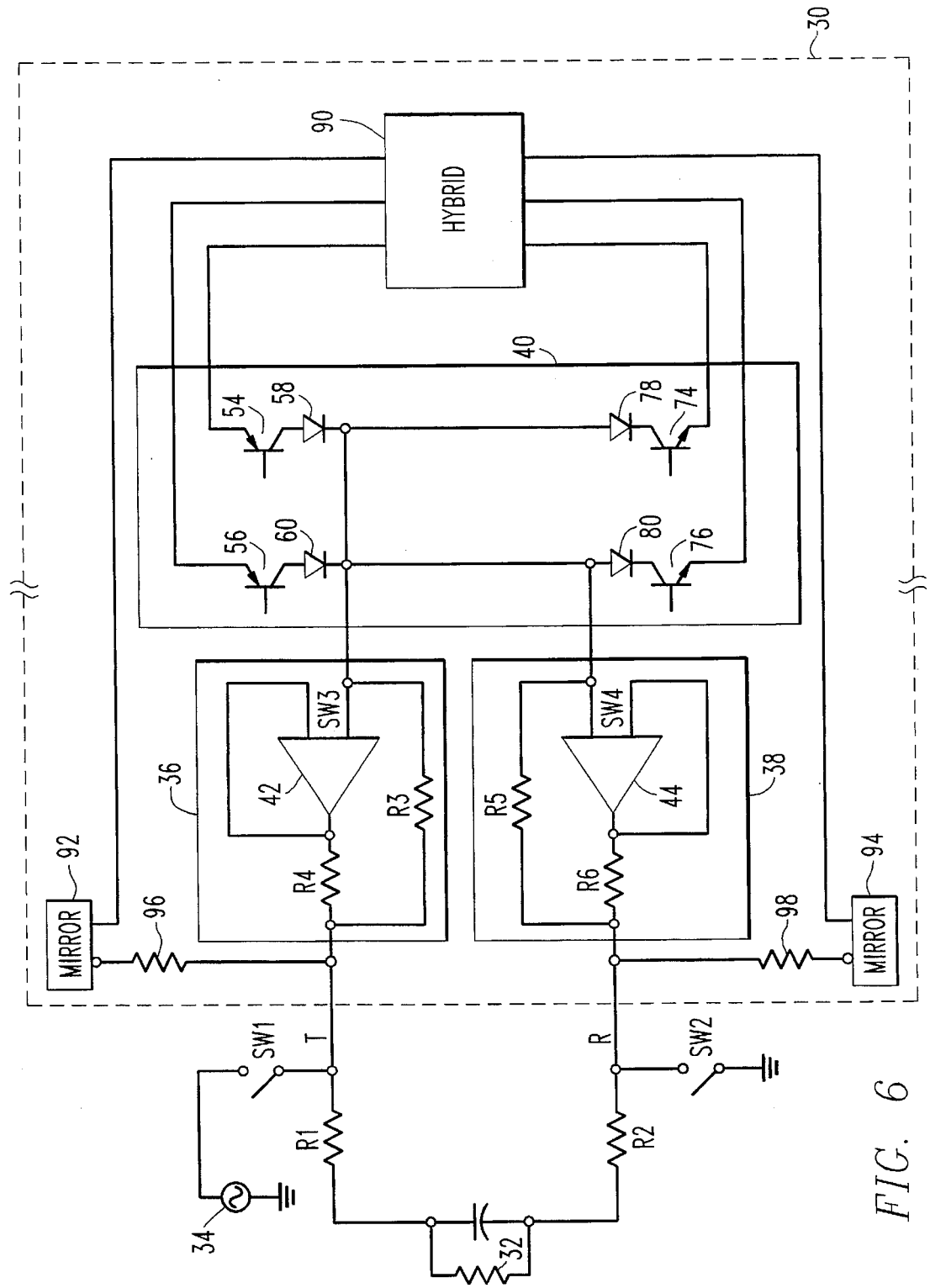
FIG. 6 is a partial block diagram of another circuit in accordance with the present invention depicting the protection of sensing circuits associated with a SLIC.

With reference to FIG. 6, sensing elements associated with the SLIC may be protected by the use of relatively large resistors in series with the sensing elements. The present invention may include current gain blocks 30, 36 which operate and are driven as described herein in association with FIG. 4. The current block drive 40 is driven from the hybrid 90, also as described in FIG. 4. Current mirrors 92, 94 sense conditions on the transmission path and provide the sensed information (by way of a mirrored current signal or otherwise) to the hybrid for further processing and, if applicable, response. If the current mirrors 92, 94 were exposed to the ringer voltage, there is a danger that the mirrors would be overloaded and/or destroyed. Accordingly, the sensing paths to the current mirrors 92, 94 may be protected by relatively large resistors 96, 98 in series with the current mirrors 92, 94.

With continued reference to FIG. 6, the resistors 96, 98 operate as sensors, developing a current which is supplied to the current mirrors 92, 94 and, ultimately, is sent to the hybrid where they are processed for various functions. Note that in this embodiment of the invention, the sense resistors are not switched out of the circuit but remain connected to the tip and ring paths when the ringer signal is applied to the telephone line. Because the resistors 96, 98 are relatively large, they can withstand the ringer signal voltage. In a preferred embodiment, the resistors 96, 98 may be on the order of 100 k ohms.

While not necessary, it may be desirable to place normally off transistors (not shown) in parallel with the current mirrors 92, 94. If such transistors are used, when the ringer signal is connected to the tip and ring paths, the transistors would be saturated so that the currents in the resistors 96, 98 are shunted away from the current mirrors 92, 94 and do not enter the hybrid 90.

While the embodiments described above have been primarily current devices, the present invention is not so limited and may be implemented with voltage devices. In addition, where the embodiments above have described a particular type of a transistor or other electrical element, it is within the scope of the invention and well within the skill of the artisan given the teachings of the present application to modify the circuits to use different types of transistors, different biases and polarities, etc. and practice the present invention.

While preferred embodiments of the present invention have been described, it is to be understood that the embodiments are illustrative only and the scope of the invention is to be defined solely by the appended claims when accorded a full range of equivalence, many variations and modifications naturally occurring to those skilled in the art from a perusal hereof.

What is claimed is:

1. A circuit for a telephone system comprising:

a subscriber line interface circuit ("SLIC") having tip and ring paths electrically interconnecting the SLIC and a telephone instrument;

a ringer generator for generating a ringer signal;

relay means for selectively applying said ringer signal to said tip and ring paths; and a selectively operable gain-setting blocking device having an amplifier capable of going into a tri-state mode isolating the SLIC from said ringer signal.

2. The circuit of claim 1 wherein said amplifier selectively operates to drive the tip path.

3. The circuit of claim 1 wherein said amplifier selectively operates to drive said ring path.

4. The circuit of claim 1 wherein said amplifier comprises an op amp and a gain-setting resistor.

5. The circuit of claim 1 further comprising means to drive said amplifier.

6. The circuit of claim 5 wherein said drive means comprises a first current source.

7. The circuit of claim 6 wherein said first current source is bidirectional.

8. The circuit of claim 1 wherein said gain-setting blocking device comprises a current gain blocking device.

9. The circuit of claim 1 wherein said gain-setting blocking device comprises a voltage gain blocking device.

10. A circuit for isolating ringer signals from a SLIC in a telephone system comprising:

tip and ring paths electrically interconnecting a SLIC and a telephone instrument;

a ringer generator for generating a ringer signal;

selectively operable relay means for applying said ringer signal to said tip and ring paths;

a selectively operable gain-setting blocking device isolating the SLIC from said ringer signal, said blocking device comprising an amplifier and means for driving said amplifier, wherein said means for driving comprises, a first current source, a first bipolar transistor; and, a first blocking diode;

said first current source, said first transistor and said first diode being electrically connected in series to said amplifier.

11. The circuit of claim 10 wherein said drive means further comprises:

a second current source;

a second bipolar transistor; and, a second blocking diode;

said second current, source, said second transistor and said second diode being electrically connected in series to said amplifier.

12. The circuit of claim 11 wherein said second source, said second transistor and said second diode operate to sink current from said amplifier.

13. The circuit of claim 10 wherein said first source, said first transistor and said first diode operate to source current to said amplifier.

14. The circuit of claim 10 wherein the SLIC and said blocking device are integrated within the same integrated circuit.

15. The circuit of claim 10 wherein said amplifier is for a voice transmission circuit of the SLIC.

16. A telephone line circuit for isolating ringer signals from a subscriber line interface circuit (SLIC) comprising:

tip and ring paths electrically interconnecting a SLIC and a telephone instrument;

a ringer signal;

selectively operable relay means for selectively applying said ringer signal to said tip and ring paths; and a selectively operable gain-setting blocking device having an amplifier capable of going into a tri-state mode isolating the SLIC from said ringer signal.

17. The circuit of claim 16 wherein said amplifier selectively operates to drive the tip path.

18. The circuit of claim 16 wherein said amplifier selectively operates to drive the ring path.

19. The circuit of claim 16 wherein said amplifier is a current gain amplifier.

20. The circuit of claim 16 wherein said amplifier is a voltage gain amplifier.

21. In a telephone line circuit having a subscriber line interface circuit (SLIC) electrically interconnected with a tip path and a ring path, means for selectively applying a ringer signal to the telephone line and means for isolating said SLIC from said ringer signal, the improvement wherein a selectively operable gain-setting blocking device having a current gain blocking device isolates portions of the SLIC from said ringer signal.

22. The circuit of claim 21 wherein said gain setting blocking device comprises an amplifier capable of going into a tri-state mode.

23. The circuit of claim 22 wherein said amplifier selectively operates to drive the tip path.

24. The circuit of claim 22 wherein said amplifier selectively operates to drive the ring path.

25. The circuit of claim 21 wherein the gain-setting blocking device comprises a voltage gain blocking device.

26. In a telephone line circuit having a subscriber line interface circuit (SLIC) electrically interconnected with a tip path and a ring path, a ringer signal which is selectively applied to the telephone line and means for isolating said SLIC from said ringer signal, the improvement comprising a selectively operable gain-setting amplifier for isolating portions of the SLIC from said ringer signal, and means for driving said amplifier, wherein said means for driving comprises, a first current source, a first bipolar transistor; and, a first blocking diode;

said first current source, said first transistor and said first diode being electrically connected in series to said amplifier.

27. The circuit of claim 26 wherein said means for driving further comprises:

a second current source;

a second bipolar transistor; and, a second blocking diode;

said second current source, said second transistor and said second diode being electrically connected in series to said amplifier.

28. The circuit of claim 27 wherein said second source, said second transistor and said second diode operate to sink current from said amplifier.

29. The circuit of claim 26 wherein said first source, said first transistor and said first diode operate to source current to said amplifier.

30. The circuit of claim 26 wherein the SLIC and said means for driving are integrated within the same integrated circuit.

31. The circuit of claim 26 wherein said amplifier is for a voice transmission circuit of the SLIC.

* * * * *